United States Patent Office 3,244,643
Patented Apr. 5, 1966

3,244,643
METHOD OF PREPARING SUPPORTED CRYSTALLINE ALUMINOSILICATE COMPOSITION
Albert B. Schwartz, Philadelphia, Pa., assignor to Socony Mobil Oil Company, Inc., a corporation of New York
No Drawing. Filed Feb. 3, 1965, Ser. No. 430,212
3 Claims. (Cl. 252—455)

This application is a continuation-in-part of application Serial No. 147,722, filed Oct. 26, 1961, now abandoned.

This application is a continuation-in-part of application silicate compositions wherein aluminosilicate crystals are contained within the pores of a solid porous support. More particularly, the present invention is directed to a method for supporting crystalline aluminosilicates in a support which structurally resembles a cage and in the presence of which the crystals are grown.

It has heretofore been known to prepare synthetic crystalline aluminosilicates by various procedures in accordance with which crystals are grown under specified conditions of time and temperature from suitable forming mixtures. The resulting compositions have often, depending on their intended use, been characterized by poor attrition resistance, low heat capacity and thermal conductivity or by a density outside a desired range. When utilized as catalysts, the crystalline aluminosilicate compositions have for certain reactions, particularly those involving conversion of hydrocarbons, been found to be extremely active. Such high activity, while generally desirable, requires close control over the amount of catalyst and over the reaction conditions in order to prevent runaway reactions from proceeding in an uncontrolled and undesired manner.

In accordance with the present invention there is provided a method which permits selection, independently of the active crystalline aluminosilicate material, of a support based on desired physical or thermal properties in the resulting composition, such as diffusivity, attrition resistance, density, heat capacity and thermal conductivity. The use of a support in intimate association with the active crystalline aluminosilicate materials following the teachings of this invention further affords a method for dilution of the active crystalline component with a substance which may have little, or negligible, chemical activity. The method described herein moreover provides a technique for utilizing as a support substances which ordinarily would be difficult to composite with the crystalline aluminosilicate into hard particles by conventional pelleting or extruding operations.

Broadly, the method of the invention comprises the steps of impregnating a porous, cage-like, solid support with an aqueous-forming mixture of the desired crystalline aluminosilicate material and maintaining the impregnated support under such conditions that crystals of the aluminosilicate grow within the pores of the support to a size sufficiently large that they are retained within the pore structure of the support upon removal of the latter from the impregnating medium but not to a size exceeding the effective diameter of said pores. The impregnated support is then removed from the impregnating forming mixture, washed, dried, and thereafter calcined. The resulting composite may, if desired, be impregnated with various materials such as metals and metal compounds appropriate to the result desired. Representative of promoting materials are the metals, metal oxides and sulfides of Group VI and Group VIII metals such as platinum, palladium, cobalt, iron, nickel, chromium, molybdenum, tungsten, uranium and combinations thereof, for example, cobolt molybdate, nickel tungsten sulfide, and the like.

The support employed in the present method is capable of wide selection and may be calalytically inert or may possess an intrinsic catalytic activity or an activity attributable to close association or reaction with the crystalline aluminosilicate. The pores of the support generally have an effective diameter within the approximate range of 0.1 to 200 microns. The particular chemical composition of the support is not critical. Thus, it is contemplated that solid porous adsorbents, carriers and supports of the type heretofore employed in catalytic, desiccating and various adsorbing operations may feasibly be used in the present method. Such materials include, by way of examples, dried inorganic oxide gels and gelatinous precipitates of alumina, silica, zirconia, magnesia, thoria, titania, boria and combinations of these oxides with one another and with other components. Other suitable supports include activated charcoal, kieselguhr, bauxite, mullite, silicon carbide, sintered alumina, various clays, etc. The support should have a porosity of at least 0.05 cc./gram and generally a porosity of between about 0.1 and about 1.0 cc./gram. The support should further be characterized by rigidity of structure and not subject to disintegration or dissolution upon prolonged contact with the impregnating medium.

The aluminosilicate which is grown in the pores of the support must be of necessity be crystalline. The support is impregnated with a forming mixture of the crystalline aluminosilicate and crystals of the latter are grown in the pores of the support to a size sufficiently large that they are retained by the porous support but not to a size exceeding the maximum pore diameter of the support. The size of the aluminosilicate crystals so grown generally have a maximum dimension of between about 0.1 and about 200 microns. Growth of crystals to a size exceeding the maximum pore diameter of the support results in fracture of the latter. The forming mixture contains the reactants used for synthesizing a crystalline aluminosilicate from an aqueous mixture having a pH of at least 11.0, preferably 11.5 or higher, and contains (1) a silica-yielding compound, (2) a source of alumina, (3) a source of alkali metal oxide, and (4) water, which are present in stoichiometric amounts sufficient to generate or provide a crystalline aluminosilicate upon crystallization of the reaction mixture. The forming mixture may be in the form of sols, a finely divided precipitate of gel. It is further contemplated that the support may be impregnated with a solution of one of the starting materials for the crystalline material and then treated, before or after drying, with a solution containing one or more other components which will form the crystal precursor in the pores.

After impregnation of the support with the forming mixture of the desired crystalline aluminosilicate, the composite is maintained under conditions susceptible to the growth of crystals. Such conditions generally entail maintaining the support in contact with the mixture for an extended period of time at an elevated temperature. After the crystals have grown in the pores of the support to at least a size capable of retention in the support, the resulting composite is separated from any excess of the forming mixture. As an alternate method of preparation, the support may be impregnated with the forming mixture at atmospheric pressure, under vacuum or even under pressure when the crystals are grown under pressure, separated from any excess forming mixture and heated in a water-immiscible liquid, such as oil, maintained at an elevated temperature or in steam under conditions which foster the growth of crystals. The composite product obtained by either of the foregoing techniques is water washed free of soluble matter and dried. Thereafter, the product may be subjected to various treatments depending on its application. For example, the product may be treated with steam, carbon dioxide, hydrogen and the like or calcined in air. The latter treatment is generally carried out at a temperature in the approximate range of 400 to 1600° F. for 0.5 to 48 hours, consistent with the intended use of the product.

The quantity of crystalline aluminosilicate introduced into the support is governed by the concentration of the reactants in the forming mixture and the porosity of the support. The concentration of crystalline aluminosilicate contained in the support can, of course, be increased by multiple impregnations of the dried support. In general, the quantity of crystalline aluminosilicate contained within the pores of the support is between about 5 and about 50 weight percent of said support.

When the product is intended for use an an adsorbent, a crystalline alkali metal aluminosilicate may be supported in a suitable porous support, such as alumina. When the product is to be employed as a catalyst, it may be desirable to replace the metal ion of the initially formed metal aluminosilicate with various other ions. Thus, the alkali metal ion of an initially formed crystalline alkali metal aluminosilicate contained within the pores of a suitable support may be replaced by base exchange with cobalt, nickel, zinc, copper, chromium, iron, zirconium, thorium, beryllium, manganese, palladium, tin, ammonium, rhenium, aluminum, silver, hydrogen, strontium, gold, potassium, calcium, platinum, ammonium, cadmium, mercury, lithium, magnesium, lanthanum, cerium and other rare earth metals. Replacement is suitably accomplished by contacting the initially formed crystalline aluminosilicate contained in the pores of the support with a solution of an ionizable compound of the ion which is to be zeolitically introduced into the aluminosilicate structure for a sufficient time to bring about the extent of desired introduction of such ion. After such treatment, the ion exchanged product is water washed, dried and calcined.

The method described herein is particularly applicable for the preparation of a supported crystalline zeolite having a structure of well defined intra-crystalline dimensions and which has the ability by reason of its intra-crystalline dimensions to allow the passage into or out of its crystalline cavities of only certain molecules, i.e., of molecules having particular shape and size. Such zeolites wherein only molecules of particular size and shape are able to enter are sometimes referred to as molecular sieves.

Synthetic molecular sieves have heretofore been described in the literature and are essentially the dehydrated forms of hydrous siliceous zeolites containing varying quantities of alkali or alkaline metal, silicon and aluminum with or without other metals. All or a portion of the alkali metal or ions normally contained in the molecular sieve structure may be zeolitically replaced with a number of other ions. The atoms of alkali metal, calcium or metals in replacement thereof, silicon, aluminum and oxygen in the zeolites are arranged in the form of an aluminosilicate salt in a definite and consistent crystalline pattern. This structure contains a large number of small cavities interconnected by a number of small channels. These cavities and channels are precisely uniform in size. Chemically, these zeolites may be represented by the general formula:

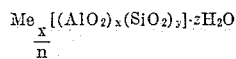

where Me is a metal cation,

is the number of exchangeable cations of valence $n$, $x$ is also the number of aluminum atoms combined in the form of aluminate, $y$ is the number of silicon atoms and $z$ is the number of water molecules, removal of which produces the characteristic channel system. In the above formula the ratio $y/x$ is a number from 0.7 to 5 and usually from 1 to 2.

In accordance with the method described herein, molecular sieves may be crystallized within the pores of a support by contacting the support with the forming mixture of the molecular sieve. The latter is generally synthesized as the alkali derivative, although not necessarily. The alkali metal ions in such form may, as desired, be exchanged for other cations. In general, the process of preparation involves heating in an aqueous forming mixture an appropriate mixture of oxides or of materials whose chemical composition can be completely represented as a mixture of oxides: alkali metal oxides, $Al_2O_3$ and $SiO_2$ and $H_2O$ at a temperature of approximately 100° C. for periods of 15 minutes or 90 hours or more. The product which crystallizes within this hot mixture is separated therefrom and water-washed until the water in equilibrium with the zeolite has a pH in the range of 9–12. The product so obtained, although hydrated, is of fixed crystallinity and is thereafter dehydrated by heating.

Following the teachings of this invention, a support is initially brought into contact with the forming mixture of the alkali metal aluminosilicate. Suitable reagents for the preparation of such aluminosilicate include silica gel, silicic acid, silica sol, or alkali metal salts of silicic acid, e.g., sodium silicate, as sources of silica. Alumina can be prepared by utilizing an alumina sol, activated alumina, gamma alumina, hydrated alpha alumina, alumina trihydrate alkali metal salts of aluminic acid, e.g., sodium aluminate, or aluminum salts, e.g., aluminum chloride. Clay may be employed as a source of silica and alumina. Alkali metal hydroxide is suitably used as the source of the alkali metal oxide and, in addition, contributes to the regulation of the pH. The alkali metal source may also be supplied from the source of silica or alumina through use of such reagents as sodium aluminate or an alkali metal silicate, e.g., sodium metasilicate. All reagents are preferably soluble in water. The reaction solution has a composition expressed as mixtures of oxides within the following ranges: $SiO_2/Al_2O_3$ of 0.5 to 40, alkali metal oxide/$SiO_2$ of 0.3 to 10.0 and $H_2O$/alkali metal oxide of 5 to 400. The reaction mixture is brought into contact with the support in a suitable vessel which is generally closed to the atmosphere in order to avoid losses of water, and mixture is then heated for an appropriate length of time, generally within the range of about 15 minutes to 90 hours during which period crystals of the aluminosilicate are formed and grow to the desired size not exceeding the maximum pore diameter of the porous support. A convenient and generally employed process of preparation involves preparing an aqueous solution of sodium aluminate and sodium hydroxide and then adding with stirring an aqueous solution of sodium silicate.

While satisfactory crystallization may be obtained at temperatures from about 20° C. to about 200° C., crystallization is desirably carried out at about 100° C. For temperatures between about 20° C. and about 150° C., an increase in temperature increases the velocity of the reaction and thus decreases its duration. The pressure may be greater than atmospheric generally less than 500 p.s.i.g. and more usually atmospheric or less corresponding to the equilibrium vapor pressure of the mixture at the reaction temperature.

After impregnation of the support with the forming mixture and subsequent crystallization, the resulting composite is separated from the impregnating medium. The composite is then washed until the wash water in equilibrium with the composite product reaches a pH of 9 to 12. The product may, if desired, then be base-exchanged and washed again. The supported crystalline aluminosilicate composition is then dried at a temperature generally in the range of 25° C. to 150° C., and subsequently calcined at a temperature in the approximate range of 200 to 850° C.

The examples set forth hereinbelow will serve to illustrate the method of the invention without limiting the same:

EXAMPLE 1

The following sodium aluminate and sodium silicate solutions were mixed after cooling to 40° F.:

*Sodium silicate solution*

| | Grams |
|---|---|
| Water | 143 |
| NaOH (97.4 weight percent purity) | 11 |
| Sodium silicate (28.7% wt. $SiO_2$, $SiO_2/Na_2O=3.22$) | 77.5 |

*Sodium aluminate solution*

| | Grams |
|---|---|
| Water | 195 |
| NaOH (97.4 weight percent purity) | 11 |
| Sodium aluminate (46% wt. $Al_2O_3$, 31% wt. $Na_2O$) | 25.6 |

The resulting precipitate was homogenized by agitation to produce a fluid, uniform slurry. Twenty grams of a porous ceramic support containing 84 weight percent alumina, 13 weight percent silica and minor amounts of the oxides of iron, titanium, calcium, magnesium, sodium and potassium were vacuum-impregnated with the slurry using enough slurry to fill the pores and voids between particles of the support. The impregnated support and surrounding slurry were heated 19 hours at 200–210° F., at the end of which time sodium aluminosilicate crystals had grown within the pores of the support. The impregnated support was separated from the surrounding fluid, washed until the pH of the effluent water dropped to 11 and thereafter dried for 20 hours at 250° F. The sodium in the crystalline aluminosilicate was ion exchanged with rare earth metal. This was effected by soaking a 20 gram of the impregnated support in 800 grams of a solution containing 2% weight rare earth chloride hexahydrates. Composition of the rare earth chloride mixture was as follows:

| | Weight percent |
|---|---|
| $LaCl_3 \cdot 6H_2O$ | 23 |
| $CeCl_3 \cdot 6H_2O$ | 43.5 |
| $PrCl_3 \cdot 6H_2O$ | 5.4 |
| $NdCl_3 \cdot 6H_2O$ | 17.9 |
| $SmCl_3 \cdot 6H_2O$ | 1.9 |
| $GdCl_3 \cdot 6H_2O$ | 0.6 |
| Other rare earth chloride hexahydrates | 0.2 |

Plus small amounts of salts of Th, Ca, Mg, Na and Al.

Soaking was continued for a total of 64.5 hours at a temperature of 200–210° F. The ion exchanged catalysts were then removed from the rare earth metal chloride solution, washed free of soluble salts, dried in an oven at 150° F. for about 18 hours and calcined 3 hours in air at 1000° F.

EXAMPLE 2

A composite was prepared as in Example 1 but using granular porous fused alumina as the support.

The products of the above examples were tested for cracking activity by passing n-decane over 10 cc. of the catalyst, crushed to 12–32 mesh at a space velocity of 1 vol./hr./vol. of catalyst and a catalyst to oil ratio of 4 vol./vol. for a period of 15 minutes. The results obtained, together with those realized using for comparison a conventional amorphous silica-alumina gel cracking catalyst containing approximately 10 weight percent alumina, are shown below:

| | Cage supported crystalline aluminosilicate catalysts | | Amorphous silica-alumina catalyst |
|---|---|---|---|
| Properties of support: | | | |
| Form | 5/16″ spheres | 4–8 mesh granules | 4–8 mesh beads. Silica-alumina (approx. 10% $Al_2O_3$). |
| Composition | {84% $Al_2O_3$, 13% $SiO_2$} | Fused alumina | |
| Porosity, cc./g | 0.20 | 0.21 | |
| Pore size, microns | 30–200 | | |
| Packed density, g./cc | 1.04 | 0.96 | |
| n-Decane cracking test: | | | |
| Time after start of test, minutes | 3 | 3 | 3. |
| Conversion, percent wt | 98.6 | 88.4 | 51.1. |
| Cracked products, percent wt.: | | | |
| $C_1$ | 1.1 | 0.9 | 1.1. |
| $C_2$ | 2.5 | 2.2 | 1.8. |
| $C_3$ | 19.7 | 18.7 | 18.1. |
| $C_4$ | 38.0 | 24.6 | 15.3. |
| $C_5$ | 23.4 | 24.9 | 9.6. |
| $C_6$ | 9.0 | 11.8 | 2.7. |
| $C_7$ | 0.9 | 1.5 | 0.4. |
| $C_8$ | 1.9 | 1.3 | 0.8. |
| $C_9$ | 2.1 | 2.5 | 1.3. |
| Coke, percent wt. of charge (over total 15 min. period) | 2.8 | 3.0 | 3.4. |

As will be seen from the foregoing results, the cage-supported crystalline aluminosilicates exhibit an extremely high activity, even though the quantity of active material in the support is low. Moreover, even though the conversion level is much higher, the yields of coke obtained with the cage-supported crystalline aluminosilicates are lower than those obtained using a conventioanl amorphous silica-alumina cracking catalyst.

EXAMPLE 3

Five hundred (500) grams of a porous ceramic support of the type employed in Example 1 were impregnated under vacuum with the same slurry as utilized in Example 1. The sample was heated for 24.5 hours at 200–210° F. at the end of which time sodium aluminosilicate crystals had grown within the pores of the support. The impregnated support was separated from the surrounding fluid, washed until the pH of the effluent water dropped to 11 and thereafter dried for approximately 18 hours at 210° F. The dried composite was again impregnated, washed and dried under similar conditions. The procedure was repeated a third time for a total of three impregnations. The dried product then obtained was ion exchanged at about 81° F. with an aqueous solution containing 0.5 weight percent ammonium chloride and 2 weight percent rare earth chloride hexahydrates having the composition set forth in Example 1 utilizing eighteen two-hour treats. The ion exchanged product was then washed free of chloride ions, dried in an oven at 220° F. for 19.5 hours and calcined in air for 3 hours at 900° F.

The resulting product was crushed to a particle size of 4–8 mesh (Tyler) and treated for 24 hours at 1200° F. in steam at a pressure of 15 p.s.i.g. The product so treated was tested for catalytic cracking activity by charging a Mid-Continent gas oil having a boiling range of 450 to 950° F. to a gasoline having an end point of 410° F. upon passage of vapors of the said gas oil through the catalyst at a temperature of 875° F. and atmospheric pressure, utilizing a feed rate of 1.5 to 7.5 volumes of liquid oil per volume of catalyst. The product was a highly effective cracking catalyst as evidenced by the following obtained results:

| | |
|---|---|
| Conversion, percent vol. | 41.9 |
| $C_4$ free gasoline, percent vol. | 37.6 |
| Total $C_4$'s, percent vol. | 7.4 |
| Dry gas, percent wt. | 2.8 |
| Coke, percent wt. | 1.9 |

It is to be understood that the above description is merely illustrative of preferred embodiments of the invention of which many variations may be made by those skilled in the art within the scope of the following claims without departing from the spirit thereof.

What is claimed is:

1. A method for preparing a supported crystalline aluminosilicate composition which comprises impregnating a solid, porous, cage-like support characterized by a porosity of at least 0.05 cc./gram and an effective pore diameter within the approximate range of 0.1 to 200 microns with an aqueous reaction mixture for synthesizing said crystalline aluminosilicate which contains:
   (a) a source of silica selected from the group consisting of silica gel, silica sol, silicic acid and alkali metal salts of silicic acid;
   (b) a source of alumina selected from the group consisting of alumina sol, activated alumina, gamma alumina, hydrated alpha alumina, alumina trihydrate and alkali metal salts of aluminic acid; and
   (c) a source of alkali metal oxide;
maintaining said support in contact with said reaction mixture at a temperature in the approximate range of 20 to 200° C. for a period of time between about 15 minutes and about 90 hours until crystals of said aluminosilicate are formed and grow to a size not exceeding the maximum pore diameter of said support, washing the resulting composite free of water-soluble matter and drying.

2. A method for preparing a supported crystalline aluminosilicate composition which comprises impregnating a solid, porous, cage-like support characterized by a porosity of at least 0.05 cc./gram and an effective pore diameter within the approximate range of 0.1 to 200 microns with an aqueous reaction mixture for synthesizing a crystalline alkali metal aluminosilicate which contains:
   (a) a source of silica selected from the group consisting of silica gel, silica sol, silicic acid and alkali metal salts of silicic acid;
   (b) a source of alumina selected from the group consisting of alumina sol, activated alumina, gamma alumina, hydrated alpha alumina, alumina trihydrate and alkali metal salts of aluminic acid; and
   (c) a source of alkali metal oxide;
maintaining said support in contact with said reaction mixture at a temperature in the approximate range of 20 to 200° C. for a period of time between about 15 minutes and about 90 hours until crystals of said alkali metal aluminosilicate are formed and grow to a size not exceeding the maximum pore diameter of said support, washing the resulting composite free of water-soluble matter, replacing by base exchange at least a portion of the alkali metal of said alkali metal aluminosilicate with another ion and drying the resulting product.

3. A method for preparing a supported crystalline aluminosilicate composition which comprises impregnating a solid, porous, cage-like support characterized by a porosity of between about 0.1 and about 1.0 cc./gram and an effective pore diameter within the approximate range of 0.1 to 200 microns with an aqueous reaction mixture for synthesizing said crystalline aluminosilicate which contains:
   (a) a source of silica selected from the group consisting of silica gel, silica sol, silicic acid and alkali metal salts of silicic acid;
   (b) a source of alumina selected from the group consisting of alumina sol, activated alumina, gamma alumina, hydrated alpha alumina, alumina trihydrate and alkali metal salts of aluminic acid; and
   (c) a source of alkali metal oxide;
wherein said reaction mixture has a concentration such that the silica/alumina mol ratio is between 0.5 to 40; the alkali metal oxide/silica mol ratio is between 0.3 to 10; and the water to alkali metal oxide mol ratio is between 5 to 400, maintaining said support in contact with said reaction mixture at a temperature in the approximate range of 20° C. to 200° C. for a period between about 15 minutes and about 90 hours, during which period crystals of said aluminosilicate are formed and grow to a size not exceeding the maximum pore diameter of said support, water-washing the resulting composite until water in equilibrium therewith has a pH in the range of 9 to 12, and thereafter drying and calcining.

References Cited by the Examiner
UNITED STATES PATENTS 2,962,435  11/1960  Fleck et al. _____ 252—455 X BENJAMIN HENKIN, *Primary Examiner.*

MAURICE A. BRINDISI, *Examiner.*

E. J. MEROS, *Assistant Examiner.*